Patented Apr. 7, 1942

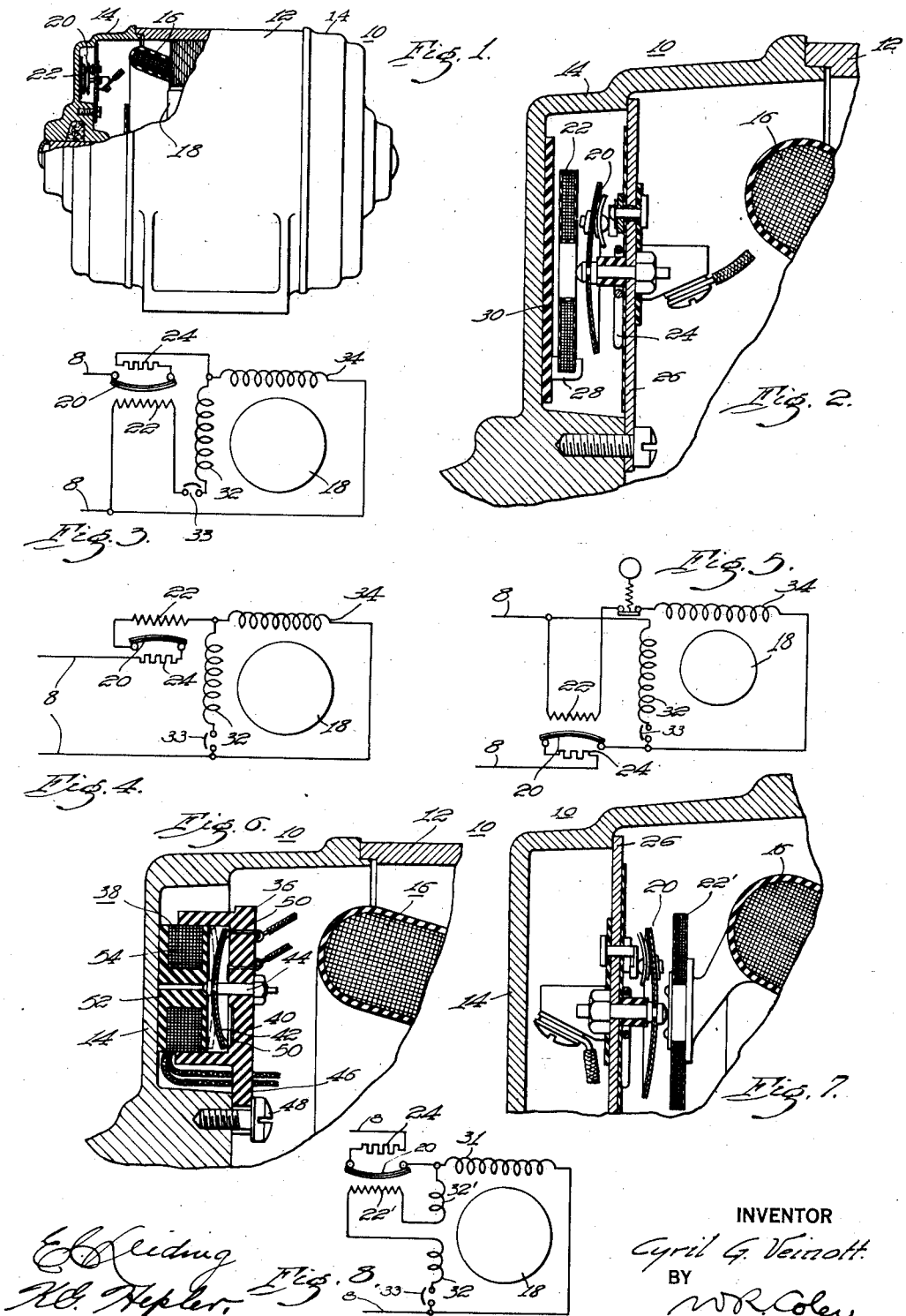

2,279,214

UNITED STATES PATENT OFFICE 2,279,214

THERMAL MOTOR PROTECTIVE DEVICE

Cyril G. Veinott, Lima, Ohio, assignor to Westinghouse Electric & Manufacturing Company, East Pittsburgh, Pa., a corporation of Pennsylvania Application July 13, 1939, Serial No. 284,160

6 Claims. (Cl. 172—279)

My invention relates to protective devices and systems, and more particularly to protective means for preventing the reenergization of a motor for a predetermined period after it has been deenergized.

With the continued use of oil burner services or the like, there is an increasing demand for an automatic resetting device which will permit the motor used therein to automatically restart only after a predetermined time period following its disconnection from a power circuit for some fault, such as a locked rotor or an overloaded starting condition or an overheating of the motor during the normal operation thereof. However, safety requirements specify that the motor must not restart or be reenergized in less than three minutes with an ambient temperature of 15° C. under the most favorable conditions, which would involve a cold stalled or stationary motor, since under all other conditions the motor would be heated to a greater extent.

It is, therefore, an object of my invention to provide a protective apparatus for an electrical translating device which apparatus, upon the deenergization of such device, will not permit the reenergization thereof, under even the most favorable conditions, for a predetermined period of time, say, three minutes, after such deenergization.

A further object of my invention is to provide a protective system for a motor which includes a heat storage means associated with a thermostatic protective device for preventing the reenergization of such motor for a predetermined period of time after deenergization thereof, even though such motor be relatively cold.

A further object of my invention is to provide a heat storage device for a thermally protected motor which is electrically associated with the windings of such motor, and is adapted to control the operations of a thermal protective device associated therewith.

Other objects of my invention will either be pointed out specifically in the course of the following description of a device embodying my invention, or will be apparent from such description.

In the accompanying drawing,

Figure 1 is a side elevational view and partial sectional view of an electrical translating device embodying my invention;

Fig. 2 is an enlarged fragmentary sectional view of the device shown in Fig. 1;

Figs. 3, 4 and 5 are schematic wiring diagrams illustrating various motor connections embodying my invention;

Fig. 6 is a fragmentary sectional view similar to Fig. 2 illustrating a modified and preferred form of a device embodying my invention;

Fig. 7 is a fragmentary sectional view similar to Fig. 2 illustrating a modified arrangement of the device embodying my invention; and Fig. 8 is a schematic wiring diagram illustrating the motor connections embodied in the arrangement shown in Fig. 7.

Referring to the accompanying drawing, in which like reference characters indicate like parts in the several figures, I show a supply circuit 8, and a single-phase motor or electrical translating device 10 including a housing 12, bearing brackets or end bells 14, stator windings 16 (preferably including the familiar starting winding 32 and running winding 34 (Fig. 3)), and a rotor 18, a thermostatic protective device 20, and a heat storage coil 22 in thermal communication with the thermostat 20.

The motor or electrical translating device 12 shown in the accompanying drawing is, in this instance, any standard motor, generator or rotative electrical translating device. However, it is to be understood that the electric translating device 10 is used herein merely as an illustrative device and that the thermal protective system embodying my invention may be used with any electrical structure.

The thermostatic protective device 20 is, in this instance, a disc-type thermostat having a radiant heater 24, preferably in the well-known form of a bare wire bent in a single loop associated therewith. However, it is to be understood that any other suitable thermostatic device may be used in lieu thereof. The thermostatic device 20 is attached to the motor end bell 14, in this instance, by a suitable plate 26 and insulated therefrom in any well known manner. The thermostatic device is thus closely related to the motor windings 16, and is adapted to be operated by the heat developed thereby, the radiant heater 24, or by the accumulated heat developed by both the radiant heater 24 and the motor windings in a well known manner.

In other words the thermostat 20 operates in a well known manner from the heat produced by the motor windings 16 and by the auxiliary heater 24 which heat usually arrives at a constant value after a short period of normal operation. However, when the thermostatic device is associated with the heat storage coil 22, such device is controlled in an additional manner, as hereinafter described. The thermostat is, in addition, electrically associated with the motor windings 16, and is adapted to disconnect or deenergize such motor when the temperature thereof reaches an unsafe value in a well known manner.

The heat storage coil 22 is formed from insulated wire which may be wound non-inductively into a compact mass. The coil may be formed into a small disc or washer-shaped structure, and is adapted to be located between the thermostatic protective device 20 and the end bell 14 (see Fig. 2). The heat storage coil 22 may be rigidly attached to the end bell 14 by means of, say, a suitable clamp 28. However, it is to be understood that the coil may be attached to the end bell or closely associated with the thermostatic device 20 in any other suitable manner.

A heat insulating disc 30 of felt-like material or insulating board such as that known by the trade-name Micarta, is located between the heat storage coil 22 and the end bell 14 to thermally and electrically insulate the heat storage coil from such end bell. The heat storage coil 22 is electrically associated with the winding 16 of the motor or electric tranlating device 10, being preferably in series with the starting winding 32 (see Fig. 3) whereby such coil will vary in temperature in accordance wtih the operation of such device 10. In addition, the heat storage coil 22, being associated with the auxiliary or starting coil 32 during the starting of the motor, will quickly increase in temperature during the starting operations of the device, as hereinafter described. The coil 22, due to its mass, retains the heat developed thereby, say, after the motor has been deenergized due to a locked or overloaded starting condition. This retained or stored heat prevents the thermostatic device 20 from resetting for a minimum predetermined time after deenergization of the motor, due to such locked or overloaded starting condition, as hereinafter described. Accordingly, the thermostatic device 20 is retained in a disengaged position, after deenergizing the device 10, for a predetermined time by such stored heat. This construction, therefore, permits the controls of the controlled mechanism, such as an oil burner, to have sufficient time to return to their starting position before reenergization of the motor.

Referring to Fig. 3, I show a preferred wiring diagram of a motor embodying my invention. It will be noted that the heat storage coil 22 is electrically connected in series with the auxiliary or starting winding 32 and a starting switch 33, preferably of the familiar centrifugal type, while the thermostatic protective device 20 is connected in series with the line. The storage coil 22 is thus adapted to receive the full amount of current passing through the auxiliary winding 32 during the starting operations of the motor.

The motor may be started in a familiar manner which needs only a brief description here. Current first traverses a circuit including heat storage coil 22, centrifugal type switch 33, starting winding 32, radiant heater 24 and thermostat 20.

The current of the auxiliary winding 32 thus flows through the heat storage coil 22 during the period when the motor 10 comes up to speed. However, once the motor is up to speed, the starting switch 33 disconnects the auxiliary winding 32 in a familiar manner, and, therefore, current will no longer pass through the heat storage coil 22. The little heat generated in the heat storage coil 22, during such normal starting operation is not sufficient to cause the thermostat 20 to trip. This heat is readily dissipated and the heat storage coil 22, therefore, has no further effect during the normal operation of the motor, except purely incidentally as the heat storage coil may affect the thermal conductivity between the thermostat 20 and the end bell of motor 10, which effect is of no importance while the motor operates on the running connection under normal conditions.

The current traversing radiant heater 24 and thermostat 20 during the above-described starting period is of such brief duration under normal starting conditions as not to cause opening of the thermostat.

However, when attempting to start a conventional motor in which there is no heat storage coil and in which the rotor of such motor is stalled or dangerously overloaded with say the motor relatively "cold," the heat generated in the auxiliary heater 24 of the thermostat 20 will, due to the abnormal passage of current through the motor cause the thermostat to disconnect such motor from the supply circuit 8. With such motor deenergized by the thermostat 20 when attempting to start under the above mentioned abnormal conditions, it follows that the end bell 14 and motor windings 16 are relatively cold. Accordingly, after deenergization of the motor the auxiliary heater 24, as well as the thermostat 20, loses heat rapidly so as to permit the thermostat to reset relatively quickly, say from a half a minute to a minute and a half, in a well known manner. However, the speed of this resetting tendency of the thermostat 20 depends upon the design of the thermostat and upon the temperature of the motor at the time power was applied under stalled rotor conditions.

However, under stalled or abnormal conditions, when the present invention is utilized, in which the heat storage coil 22 is associated with the thermostat, while the thermostat 20 is increasing in temperature to its tripping value, the heat storage coil 22 is also increasing in temperature, on account of being connected in the starting circuit. Due to the mass of such coil 22, it will retain the heat produced thereby for a considerable time after the deenergization of the motor, as compared with the thermostat 20 and radiant heater 24. The heat so developed and stored within heat storage coil 22 will thus, due to the mass of such coil, be slowly dissipated. Accordingly, it follows that, due to the close physical relationship between the thermostatic device 20 and heat storage coil 22, the heat stored within the coil 22, which is slowly dissipated therefrom, will be conveyed to the thermostat 20, causing such thermostatic device to remain in its open position for a relatively long period of time. The length of this safety period may be adjusted to any predetermined value, by varying the mass of the coil 22 and by adjusting the operating characteristics of the thermostat.

It, therefore, follows that the length of time that the thermostat 20 will remain in its open position after deenergization of the motor 10 depends upon the heat stored within the coil 22. Inasmuch as the heat stored within the coil 22 is directly proportionate to the mass of such coil, the length of time that the thermostat remains in its open position may be selected to have any predetermined value. It is preferred, however, that the coil 22 be of such mass that it will cause the thermostat 20 to remain in its open position from 3 to 5 minutes beyond the normal closing time of such thermostat.

If desired, the heat storage coil 22 may be connected in series with the main winding 34 or in series with the power leads or supply circuit 8 (see Fig. 4 and 5). However, it is to be understood that the heat storage coil 22 will cooperate with the thermostatic device 20 and function in the manner hereinabove described regardless of whether such coil be connected in series with the main winding or in series with the line. With the storage coil 22 connected in either such manner, there will be current flowing therethrough at all times and the resultant heat therefrom will tend to accelerate the tripping of thermostat 20 under running conditions. However, this tendency may be compensated for by practices well known to the art, such as by raising the opening temperature of the thermostat disc or by suitably changing the ohmic resistance of heater 24.

Accordingly, it follows that in the above described systems the heat storage coil 22 is electrically associated with at least one of the windings of the motor and is in thermal communication with the thermostatic device 20 so as to prevent the reenergization of the motor for a predetermined period of time after the deenergization thereof by the thermostatic device.

Referring to Fig. 6, I show a preferred modification of the device embodying my invention, comprising a thermostatic structure 36 and a heat storage coil structure 38. The thermostatic structure includes a base member 40, a bimetallic member 42 and a supporting stud 44. The base member 40, formed of an insulating material, preferably a phenolic resin, includes an outwardly extending flange portion 46 through which a bolt 48 is passed to rigidly attach such base to the motor end bell 14. The bimetallic member 42 is retained within a centrally located cylindrical hollow portion in base 40 by means of the stud 44. The bimetallic member 42 cooperates with contacts 50 and is adapted to carry current. Accordingly, such member includes its own auxiliary heater.

The heat storage coil structure 38 comprises a spool 52 and a coil 54. The spool 52 is formed of insulating material and is adapted to fit tightly between the inside surface of the end bell 14 and the head of the stud 44, and within the centrally located cylindrical hollow portion of the base member 40. The storage coil 54 is wound within the spool 52 of suitably insulated fine wire so as to form a large mass, as hereinabove described. The inner portion of the spool 52 is preferably thinner than the outer portion so as to permit the free and ready access of heat from the coil to the bimetallic member 42.

The heat storage structure 38 cooperates with the thermostat bimetallic member 42 in a manner as hereinabove described to prevent the reenergization of the motor for a predetermined period of time after the deenergization thereof by the thermostat due to a locked rotor or an unduly overloaded starting condition, or the like.

If it be desired, the thermostatic device 20 may be reversibly mounted by being located or positioned upon the opposite side of the plate 26 so as to be closely associated with the windings 16 of the motor 10. With the thermostat arranged in such a manner, it follows that the windings themselves will function to a minor degree as a heat storage coil. However, with such an arrangement of the thermostat, I preferably bring a portion of the auxiliary winding 32' out from the main windings 16' to form a heat storage coil 22'. (See Figs. 7 and 8.) The heat storage coil 22' will then be attached to the winding 16 and closely associated with the thermostatic device 20. The heat storage coil 22' is, in this instance formed from a portion of the auxiliary winding or in series with such winding. However, it is to be understood that the coil 22' mounted intermediate the thermostat 20 and main winding 16 may be formed in any desired manner and may be attached to, say, the plate 26 rather than the winding 16.

The heat storage coil 22' cooperates with the reversibly mounted thermostatic device 20 in a manner similar to that hereinabove described so as to insure that the motor 10 will not restart or be reenergized in less than a predetermined minimum time limit after the motor has been deenergized by the thermostatic device 20 due to such structure increasing in temperature to a predetermined deenergizing value.

Various other modifications may be made in the device embodying my invention without departing from the spirit and scope thereof, and I desire, therefore, that only such limitations shall be placed thereon as are imposed by the prior art and the appended claims.

I claim as my invention:

1. The combination with a dynamo-electric machine having an auxiliary and a main winding and thermostatic means thermally associated with and adapted to deenergize the windings under predetermined conditions of the machine, of a non-inductively wound heat storage coil of appreciable heat-retaining capacity energized at the same time as at least one of the windings and thereby adapted to generate and store heat, said coil being positioned in direct thermal communication with the thermostatic means for preventing the reenergization of said windings thereby for a predetermined appreciable period of time after deenergization thereof.

2. The combination with a dynamo-electric machine having a plurality of windings, of thermostatic means for deenergizing said windings under predetermined load conditions, and heat-storage means of appreciable heat-retaining capacity including a spool and a coil of insulated wire wound about such spool so as to have a large mass, said coil being energized at the same time as at least one of the windings and thereby adapted to generate and store heat, said coil being positioned in direct thermal communication with the thermostatic means for preventing the reenergization of said windings thereby for a predetermined appreciable period of time after deenergization thereof.

3. The combination with a dynamo-electric machine having a frame and a plurality of windings, of a thermostatic structure having a heat-responsive member for deenergizing the machine under predetermined load conditions, and heat-storage means of appreciable heat-retaining capacity including a spool and a coil of wire wound about such spool so as to have a large mass, said coil being energized at the same time as at least one of the windings and thereby adapted to generate and store heat, said coil being positioned in direct thermal communication with the heat-responsive member for preventing the reenergization of said windings thereby for a predetermined appreciable period of time after deenergization thereof, said thermostatic structure being adapted to retain the heat-storage means in close relationship with the heat-responsive member.

4. The combination with a dynamo-electric machine having a plurality of windings, contact means for opening and closing the circuit thereof, and thermostatic means thermally associated with at least one of said windings and adapted to open said contact means to deenergize the windings under predetermined conditions of the device, of heat-storage means energized through said contact means when in its closed position at the same time as at least one of the windings and thereby adapted to generate and store heat, said coil being positioned to thermally influence said thermostatic means to delay the reenergization of said windings by said contact means for a predetermined appreciable period of time after the deenergization thereof.

5. The combination with an electrical motor having a frame and a plurality of windings, contact means for opening and closing the circuit thereof, and thermostatic means adapted to open said contact means to deenergize the windings under predetermined conditions of the device, said thermostatic means being positioned within said frame to receive heat from at least one of said windings, of a heat storage coil energized through said contact means when in its closed position at the same time as at least one of the windings and thereby adapted to generate and store heat, said coil being positioned to thermally influence said thermostatic means to delay the reenergization of said windings by said contact means for a predetermined appreciable period of time after the deenergization thereof.

6. The combination with an electrical motor having a frame and a plurality of windings, contact means for opening and closing the circuit thereof, and thermostatic means adapted to open said contact means to deenergize the windings under predetermined conditions of the device, said thermostatic means being positioned within said frame to receive heat from at least one of said windings, of a heat storage coil energized through said contact means when in its closed position at the same time as at least one of the windings and thereby adapted to generate and store heat, said coil being positioned to thermally influence said thermostatic means during the decay of heat from said coil to hold said thermostatic means and said contact means open to delay the reenergization of said windings by said contact means for a period of not less than three minutes with an ambient temperature of 15° C.

CYRIL G. VEINOTT.